(12) United States Patent
Jia et al.

(10) Patent No.: US 9,204,394 B2
(45) Date of Patent: Dec. 1, 2015

(54) SIGNATURE-CODED WAKE-UP TRANSMISSION

(71) Applicant: QUALCOMM Incorporated, San Diego, CA (US)

(72) Inventors: Zhanfeng Jia, Belmont, CA (US); David Su, Saratoga, CA (US); Ning Zhang, Saratoga, CA (US); Kai Shi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 13/797,608

(22) Filed: Mar. 12, 2013

(65) Prior Publication Data

US 2014/0269462 A1    Sep. 18, 2014

(51) Int. Cl.
*H04W 52/02* (2009.01)
(52) U.S. Cl.
CPC .................. *H04W 52/0229* (2013.01)
(58) Field of Classification Search
USPC ......................................................... 370/311
See application file for complete search history.

(56) References Cited

U.S. PATENT DOCUMENTS

2003/0236077 A1* 12/2003 Sivard .......................... 455/127.1
2008/0112380 A1* 5/2008 Fischer .......................... 370/338
2011/0158303 A1 6/2011 Gauthier et al.
2011/0285533 A1 11/2011 Rotzoll
2012/0020267 A1 1/2012 Sharma et al.
2012/0071124 A1 3/2012 Leoncavallo

OTHER PUBLICATIONS

Choi, et al., "An Interference-Aware 5.8GHz Wake-Up Radio for ETCS," 2012 IEEE Internaitonal Solid-State Circuits Conference Digest of Technical Papers (ISSCC), 2012, pp. 446-448.
Mishra, et al. "S-WOW: Signature based Wake-on-WLAN," Department of Computer Science and Engineering Department of Electrical Engineering, Indian Institute of Technology. Kanpur, India 208016, Jan. 2007.

* cited by examiner

*Primary Examiner* — Awet Haile
*Assistant Examiner* — Kent Krueger
(74) *Attorney, Agent, or Firm* — Holland & Hart LLP (57) ABSTRACT

A wake-up radio is configured to scan for transmissions while the radio receiver is in sleep mode. The wake-up radio detects incoming RF transmissions intended for the radio receiver by analyzing data frame characteristics in an incoming RF transmission. The data frame characteristics may contain a signature code that is unique to the radio receiver. The signature code may be based on the time duration of a sequence of orthogonal frequency division multiplex (OFDM) symbols received in a clear to send to self (CTS2S) transmission or a time duration of short interframe spaces (SIFS) used to transmit the data frames.

27 Claims, 6 Drawing Sheets

SIGNATURE-CODED WAKE-UP TRANSMISSION

BACKGROUND

Power consumption is an important aspect in the design of a wireless device especially for a wireless device operating on battery power. The dominant source of energy consumption in a wireless device is the radio. Some wireless devices utilize power management protocols to reduce the power consumption of the radio by duty cycling the radio. The radio may be placed into sleep mode intermittently. The radio needs to wake up frequently in order to check for communications from neighboring devices. The uncertainty of the arrival of an incoming message has a negative impact on the power management protocol since switching the radio between sleep mode and an active mode often results in wasted energy.

Some wireless devices utilize a wake up radio to trigger an interrupt to transition the radio out of sleep mode. The wake-up radio is a low-power, secondary radio that monitors the radio channel for the occurrence of an external event. The wake-up radio may be a simple radio that is capable of generating an interrupt signal with minimal hardware components. The wake-up radio improves the performance of the radio by maximizing the sleep mode of the radio receiver without compromising latency and throughput. However, a wake-up radio may generate an excessive amount of false wake-ups due to poor filtering of nearby signals transmitted with high transmit power. The false wake-ups cause the radio to wake up unnecessarily thereby increasing the power consumed by the wireless device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A radio receiver includes a wake-up radio to monitor a wireless medium, in a low power state, while the radio receiver is in sleep mode. The wake-up radio is preconfigured with a unique signature code that is used to identify when an incoming transmission is intended for the radio receiver. When the wake-up radio is operational, the wake-up radio receives clear to send to self (CTS2S) transmissions that may contain an embedded signature code. The signature code is based on data frame characteristics that have a fixed timing structure, such as constant time values. The signature code may be the time duration of the OFDM symbols that are transmitted in a CTS2S transmission. Alternatively, the signature code may be the time duration of the single interframe spaces (SIFS) used to transmit data frames in a CTS2S transmission. The use of the signature code in this manner minimizes the number of false wake-ups thereby preserving the power consumed by the radio receiver.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
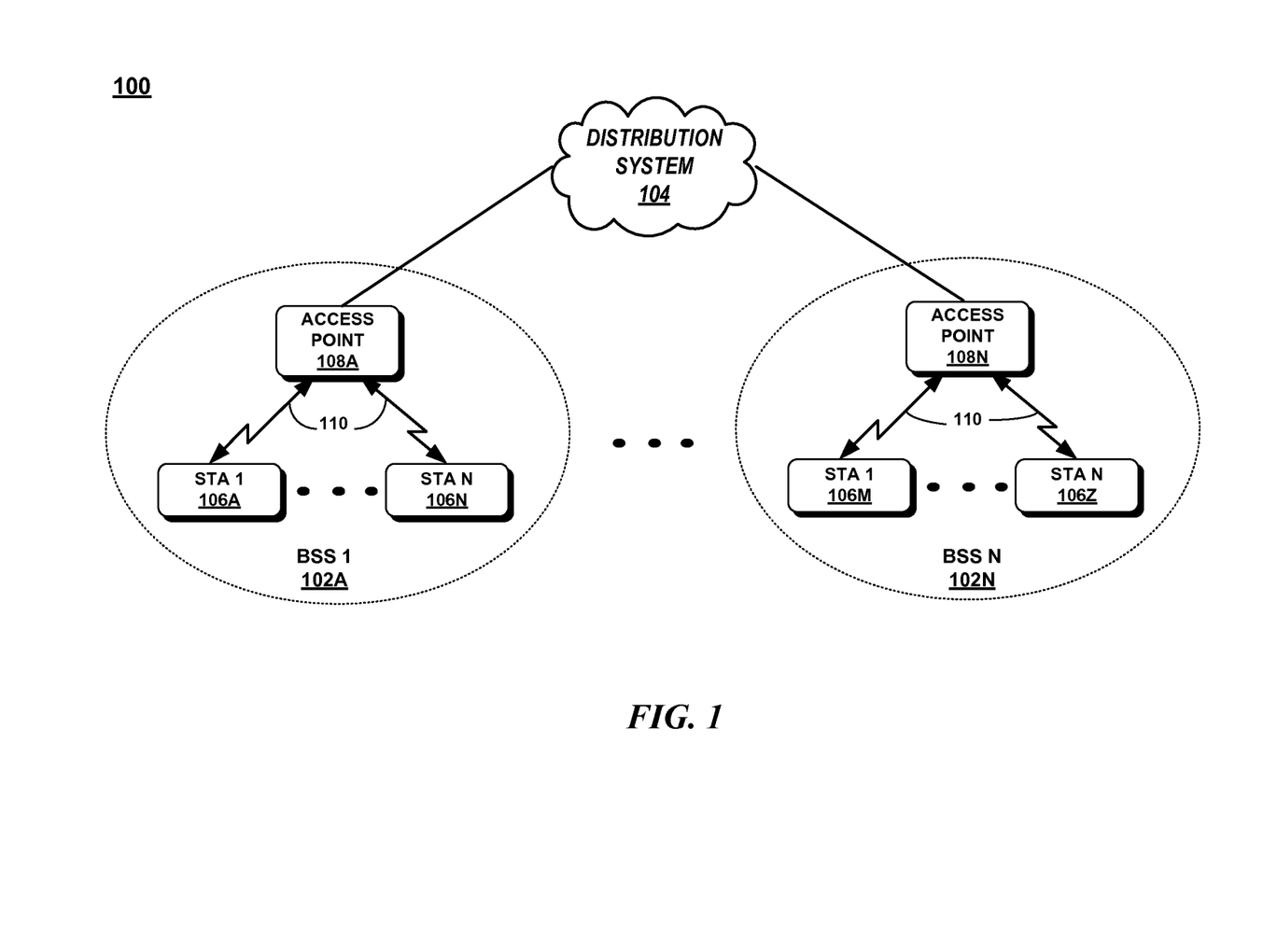
FIG. 1 illustrates an exemplary wireless network system.

FIG. 1 illustrates a block diagram of an exemplary wireless local area network (WLAN) 100 configured to implement an IEEE 802.11 communication protocol. The network 100 may be configured with one or more basic service sets (BSSs) 102A, 102N (collectively, "102") coupled to a distribution system 104. Each BSS 102A, 102N may include several stations (STAs) 106A-106Z (collectively, "106") and an access point (AP) 108A, 108N communicatively coupled wirelessly through a wireless medium 110. An access point is a station operating as a coordinator of the BSS. A station within the BSS may communicate with other stations within the BSS. A BSS may be configured as an independent BSS where stations communicate with other stations within direct communication range of each other. Alternatively, a BSS may be configured as an infrastructure BSS where all communications are relayed through an access point. The distribution system 104 provides the communication means for an access point to communicate with other access points in order to deliver frames for a station within its respective BSS. The distribution system 104 may be a wired network or a dedicated device that serves as a bridge to a backbone network.

In an infrastructure BSS, a station associates with an access point to obtain network services. A station initiates an association request and access may be granted or denied based on the data provided in the association request. The association request contains information on the capabilities of the station, such as the data rates the station supports and the modulation method utilized by the station to transmit data through an assigned channel. For example, a station supporting any one of the IEEE 802.11 specifications may utilize orthogonal frequency division multiplexing (OFDM) to transmit data. Based on the association request, an access point may grant or deny a station association within a BSS.

A station, including an access point, may be any type of electronic device capable of executing programmable instructions such as, without limitation, a mobile device, a personal digital assistant, a mobile computing device, a smart phone, a cellular telephone, a handheld computer, a server, a server array or server farm, a tablet, a web server, a network server, an Internet server, a work station, a mini-computer, a mainframe computer, a supercomputer, a network appliance, a web appliance, a distributed computing system, multiprocessor systems, or combination thereof.

The stations within a BSS communicate through the wireless medium using predetermined physical (PHY) layer and medium access control (MAC) layer communication protocols. The PHY layer performs the carrier-sense, transmit, and receive functions. The PHY layer interfaces between the wireless medium and the MAC layer. The MAC layer coordinates access to the shared wireless medium.

A MAC layer protocol may utilize a carrier sense multiple access with collision avoidance (CSMA/CS) protocol to access the wireless medium. The CSMA/CS protocol is a contention-based access method that employs collision avoidance. A collision may occur when several stations simultaneously transmit on overlapping channels. Before starting a transmission, a station has to keep sensing the channel for an additional random time after detecting the channel is idle for a minimum amount of time. If the channel remains idle for this additional random amount of time, the station is allowed to initiate its transmission.

The CSMA/CS protocol consists of a sequence of frame exchanges between the stations and access point in a BSS. A station may attempt to gain access to the wireless medium by transmitting a Request To Send (RTS) frame using the channel assigned to the station. The RTS frame includes a duration field which indicates the amount of time needed for the transmission. Each station has a Network Allocation Vector (NAV) which is a timer used to indicate the amount of time that the medium is busy. A station sets the NAV to an expected time when the station may contend for the wireless medium. Neighboring stations that receive the RTS frame may refrain from attempting to transmit signals for a time period by setting their NAV to the time indicated in the duration field.

A destination station may respond to the received RTS frame by sending a Clear To Send (CTS) frame. Upon receipt of the CTS frame, the requesting station has gained access to the wireless communications medium and initiates transmission of its data using the specified modulation method.

An access point may attempt to access the wireless medium to transmit frames to itself through a Clear To Send To Self (CTS2S) frame. The CTS2S frame has the destination address of the sending access point or station. The CTS2S frame notifies other stations using the wireless medium that the access point will be using the wireless medium for the time necessary to transmit the CTS2S and the OFDM-modulated data frames. Although the station sends the CTS2S to itself, all stations on the network are required to listen to the CTS2S frames.

Figure 2:
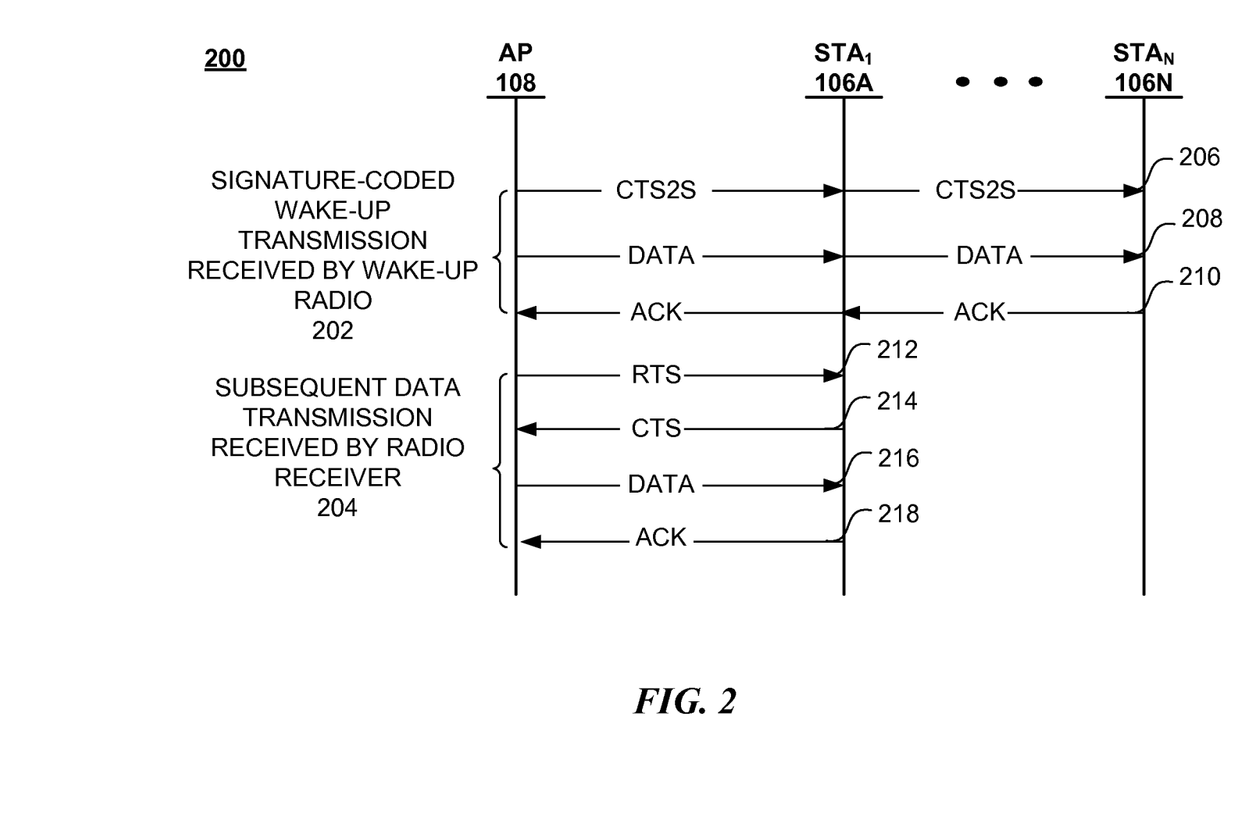
FIG. 2 is a diagram illustrating exemplary transmissions between an access point and multiple stations within a wireless network system.

FIG. 2 is a diagram illustrating exemplary transmissions between an access point 108 and multiple stations 106A-106N within a wireless network system 200 in accordance with one embodiment of the present invention. As illustrated by FIG. 2, an access point 108 may initiate a signature-coded wake-up transmission 202 using a CTS2S transmission. The CTS2S transmission 202 may consist of a CTS2S frame 206 followed by one or more data frames 208. Each of the stations 106A-106N receiving the CTS2S transmission may respond with an acknowledgement (ACK) 210. The CTS2S transmission 202 is received by a wake-up radio in a station which analyzes a signature code embedded in the transmission. The nature of the embedded signature code is described in more detail below in connection with FIG. 3. If the signature code in the CTS2S transmission matches a signature code associated with the wake-up radio in station 106A, then this wake-up radio initiates an interrupt to switch the radio receiver in this station 106A from a sleep state into an active state. As described in more detail below, each station stores a corresponding signature code, which may uniquely identify the station. Once in an active state, the radio receiver is able to receive an incoming data transmission 204. The incoming data transmission 204 may be a RTS frame 212 transmitted from the AP 108 to the destination station 106A. In response, the station 106A transmits a CTS frame 214 to the AP 108. Data 216 is then transmitted from the AP 108 to the destination station 106A, and the destination station 106A responds with an acknowledgment frame 218 to the AP 108.

Figure 3:
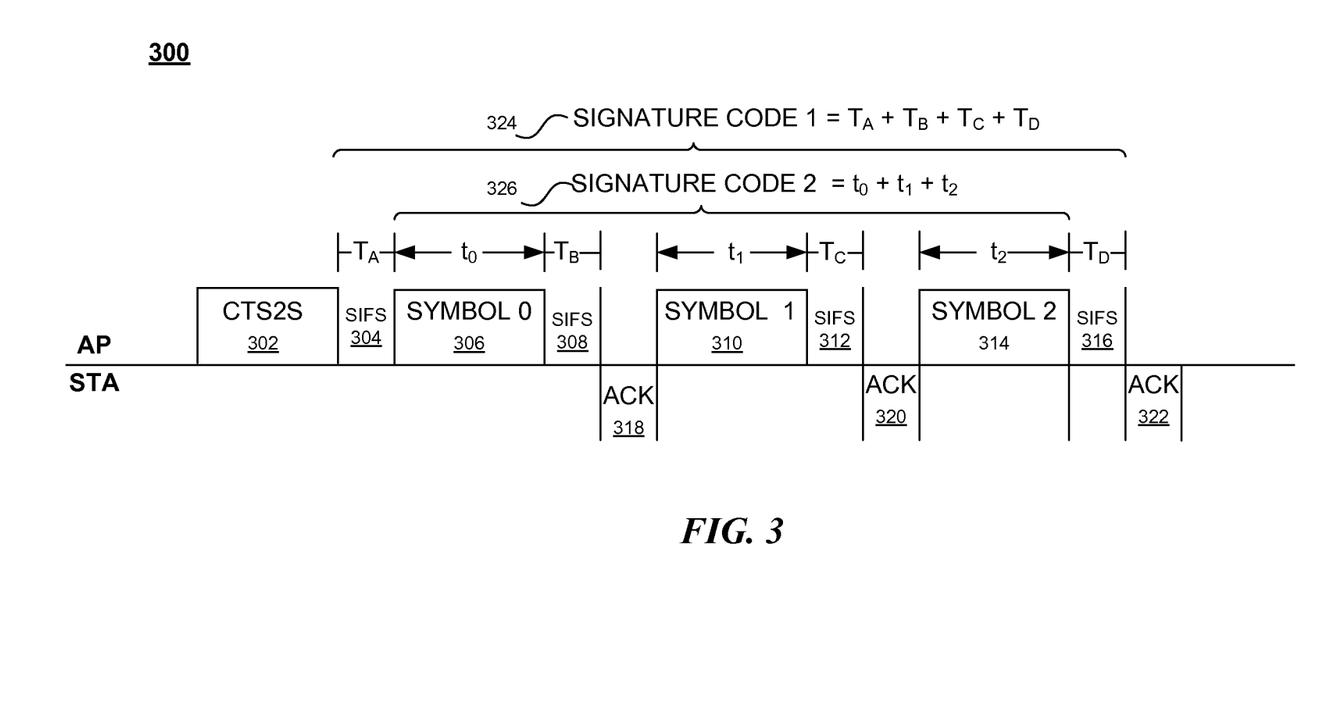
FIG. 3 illustrates exemplary signature-coded wake-up transmissions.

FIG. 3 illustrates exemplary signature-coded wake-up transmissions. A signature-coded wake-up transmission may be initiated by an access point and include a CTS2S frame 302 followed by a sequence of data frames 306, 310, 314. The time interval between a data frame and an acknowledgment is referred to as the Short Interframe Space (SIFS). The duration of the SIFS has a fixed timing structure or constant time value that is specified in a respective IEEE 802.11 specification. As a fixed timing structure, the SIFS is the same constant value throughout every transmission. For transmissions following the IEEE 802.11b/g specification, the SIFS is 10 us and for transmissions following the IEEE 802.11a specification, the SIFS is 16 us.

Each data frame may represent an OFDM symbol. OFDM is a spread spectrum signal modulation technique in which the available bandwidth is subdivided into a number of narrowband, lower rate data channels referred to as subcarriers. The subcarriers are overlapping and orthogonal to each other in order to obtain high spectral efficiency. Data is transmitted in the form of OFDM symbols. An OFDM symbol has a predetermined duration or symbol time $T_s$ that is the inverse of the subcarrier spacing. The subcarrier spacing is based on the number of subcarriers spanning a fixed channel bandwidth. In the case of 64 subcarriers that span a 20 MHz channel, the subcarrier spacing is 312.5 KHz and the symbol duration is 4 usecs (3.2 us+0.8 us (guard interval)).

The time duration of each OFDM symbol has a fixed timing structure that is a constant value for each OFDM symbol. The OFDM symbol duration may be specified in a respective 802.11 specification. The IEEE 802.11a/g/n specifications have a fixed OFDM symbol duration of 4 us.

FIG. 3 illustrates two exemplary signature codes. The first signature code 324 is the time duration of all the SIFS used in the CTS2S transmission. As shown in FIG. 3, signature code 324 is the duration of the time period $T_A$ of SIFS 304, the time period $T_B$ of SIFS 308, the time period $T_C$ of SIFS 312, and the time period $T_D$ of SIFS 316. The second signature code 326 is the duration of all the OFDM symbols transmitted in the CTS2S transmission. As shown in FIG. 3, signature code 326 is the duration that includes time period $t_0$ of Symbol 0 306, time period $t_1$ of Symbol 1 310, and time period $t_2$ of Symbol 2, 314.

Although FIG. 3 shows the signature code based on the time duration of selected data frame characteristics (i.e., OFDM symbol duration and SIFS) within the CTS2S transmission, the embodiments are not limited to the data frame characteristics shown in FIG. 3. Any component of a frame transmission that has a fixed timing structure may be used.

Figure 4:
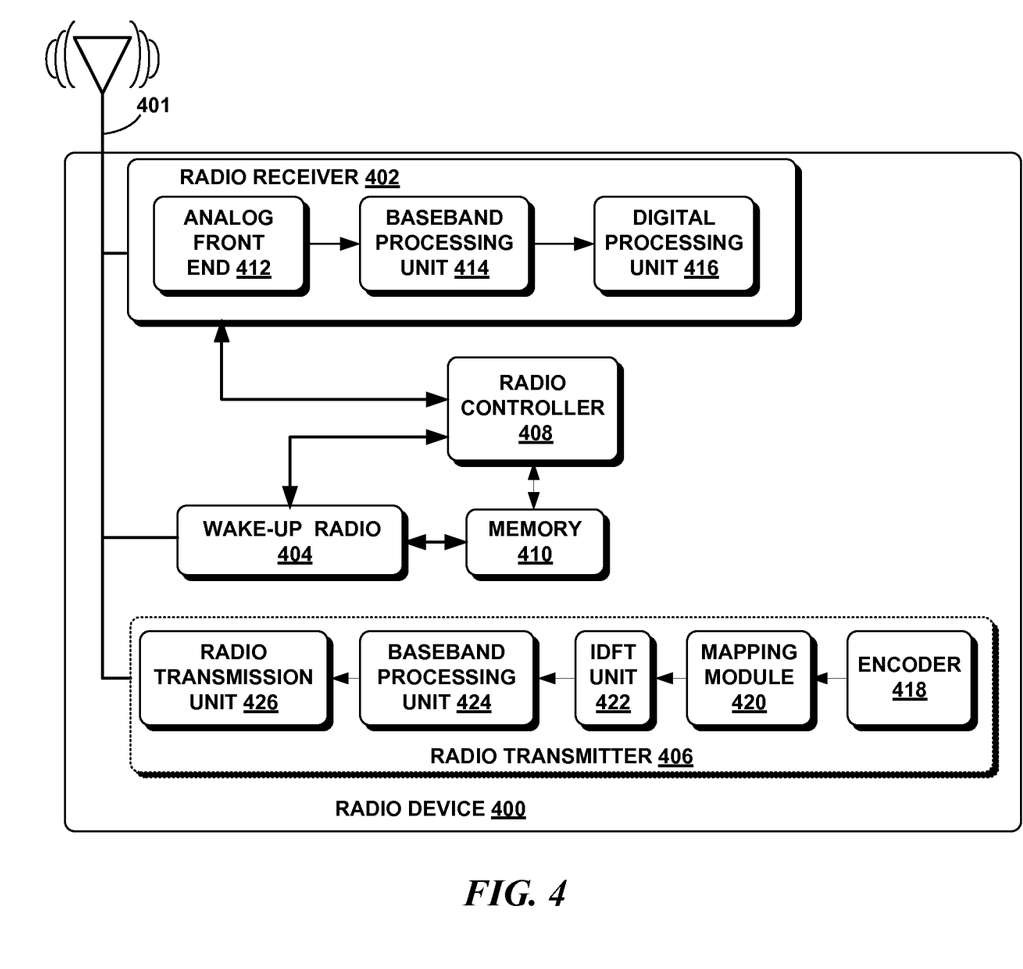
FIG. 4 is a block diagram illustrating an exemplary radio receiver.

Attention now turns to a discussion of an exemplary radio device receiving a signature-coded wake-up transmission. FIG. 4 is a block diagram of radio device 400 that is used to implement signature-coded wake-up in accordance with one embodiment of the present invention. As illustrated by FIG. 4, radio device 400 includes at least one antenna 401, a radio receiver 402, a wake-up radio 404, a radio controller 408, and a memory 410. The radio receiver 402 receives a RF signal from the wireless medium and generates an MPDU for the MAC layer. The RF signal is received through an antenna 401 coupled to the radio receiver 402. The radio controller 408 controls duty cycling the radio receiver 402 between a sleep mode and an active mode and controls activation and deactivation of the wake-up radio 404. The wake-up radio 404 is active during the radio receiver's sleep mode and it listens for communications on the wireless medium. The memory 410 may be used to provide storage for program instructions, data, and the signature codes used by the wake-up radio 404 and radio controller 408. That is, the memory 410 may store a signature code that corresponds with the duration of a predetermined number of SIFS and/or the duration of a predetermined number of OFDM symbols. The memory 410 may provide this signature code to the wake-up radio 404 and/or the radio controller 408.

The radio receiver 402 may include an analog front end (AFE) 412, a baseband processing unit 414, and a digital processing unit 416. The antenna 401 receives RF signals which are received by the AFE 412. The AFE 412 may include one or more amplifying stages to amplify the received RF signal, one or more filtering stages to remove unwanted bands of frequencies, mixer stages to down-convert the received RF signal, an automatic gain control (AGC) unit to adjust the gain to an appropriate level for a range of received signal amplitude levels and an analog-to-digital converter (ADC) to convert the received RF signal to digitized I and Q signals. The baseband processing unit 414 filters the I and Q signals and performs further processing. The digital processing unit 416 demodulates the digitized I and Q signals, recovers the modulated OFDM symbols, and generates an MPDU for the MAC layer.

The radio receiver 402 may be configured to operate in at least a sleep mode and an active mode. When in active mode, the radio receiver 402 receives and processes RF signals and general communication functions associated with a wireless receiver. Sleep mode may be performed in one of a variety of sleep states. In one embodiment, sleep mode may be characterized by the radio receiver 402 performing no processing which may be facilitated by power shut off to all or a portion of the components of the radio receiver 402. Alternatively, in other embodiments, sleep mode may be characterized by the radio receiver 402 performing processing at a reduced rate characterized with a reduced voltage and/or power supply or power shut off to a portion of the components of the radio receiver 402.

The wake-up radio 404 may be configured as a simple RF envelope detector without active filtering or amplification of the incoming RF signal. The wakeup-radio 404 detects the amplitude or strength of the incoming RF signal at various time points (e.g., while the radio receiver 402 is in the sleep mode), and analyzes the energy values over time to determine if the incoming RF signal includes an embedded signature code that matches the signature code stored by the memory 410. In an embodiment, the signature code may be a sequence of a predetermined number of OFDM symbol durations (e.g., signature code 326 of FIG. 3). The wake-up radio 404 may use an RF envelope detector to detect the energy of each OFDM symbol duration (e.g., 4 us), and the wake-up radio 404 keeps track of the number of such durations. If the time durations match the corresponding signature code stored in the memory 410, then the wake-up radio 404 generates an interrupt signal that is transmitted to the radio controller 408. In response, the radio controller 408 causes the radio receiver 402 to transition from the sleep mode to the active mode. In another embodiment, the signature code may be the time duration of a sequence of SIFSs between data frames (e.g., signature code 324 of FIG. 3). The wake-up radio 404 may use an RF envelope detector to detect the energy of each SIFS between each data frame. If the time duration of the SIFSs match a corresponding signature code stored in the memory 410, then the wake-up radio 404 generates an interrupt signal to the radio controller 408. In response, the radio controller 408 causes the radio receiver 402 to transition from the sleep mode to the active mode.

Although the wake-up radio 404 determines whether the incoming RF signal includes a signature code that matches signature code stored by the memory 410 in the examples described above, it is understood that in other embodiments, this function may be performed by the radio controller 408. In such an embodiment, the wake-up radio 404 transmits information representative of the received RF signal to the radio controller 408, and in response, the radio controller 408 determines whether the incoming RF signal includes an embedded signature code that matches the signature code stored by the memory 410.

In another embodiment, the wake-up radio 404 may be configured to receive and process the same type of RF signal as the radio receiver 402 with a lower level of power consumption than radio receiver 402. In addition, the wake-up radio 404 may receive RF signals characterized by a lower quality level than the RF signals received and processed by the radio receiver 402. For example, the A/D converters of the wake-up radio 404 may utilize a lower number of bits or quantization levels, or a reduced sampling rate than those which are used in the radio receiver 402. In other embodiments, when compared with the radio receiver 402, the wake-up radio 404 may utilize digital filters having a lower number of taps, a reduced number of components and amount of processing, or omit certain filters. Alternatively, the wake-up radio 404 may perform signal processing at a lower clock rate, lower bit resolution, and/or reduced voltage level, etc., than the radio receiver 402.

In some embodiments, the radio device 400 may include a radio transmitter 406. The radio transmitter 406 transmits a signal as a sequence of OFDM symbols over the wireless medium to a receiver. The radio transmitter 406 may include an encoder 418, a mapping module 420, an inverse discrete Fourier transform (IDFT) unit 422, a baseband processing unit 424, and a radio transmission unit 426. The encoder 418 receives a MAC protocol data unit (MPDU) that the PHY layer transports. The MPDU is a segment of information including overhead and payload fields. The encoder 418 performs processing such as scrambling, error correction coding and interleaving. The encoded data is fed into a mapping module 420 that takes groups of bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol.

The mapping module 420 determines which of the subcarrier frequencies within the OFDM bandwidth are used to transmit information and the type of modulation to be used on each of the subcarriers. The IDFT module 422 performs the modulation of the resulting set of N complex numbers determined by the mapping module 420 onto N orthogonal carrier waveforms. The modulated subcarriers are combined by the IDFT module 422 to form a discrete time symbol waveform. The baseband processing unit 424 combines a sequence of symbols (e.g., consecutive symbols) into a symbol set that can be transmitted as a block over the wireless medium. The baseband processing unit 424 may also append a preamble to the symbol set that may be used for automatic gain control and symbol timing synchronization. The radio transmission unit 426 couples an analog signal containing a continuous-time version of the symbol set to the wireless medium.

Although the radio device 400 shown in FIG. 4 has a limited number of elements in a certain configuration, it may be appreciated that the radio device 400 may include more or less elements in alternate configurations as desired for a given implementation. For example, radio device 400 may be part of a multiple-in multiple-out (MIMO) system, where multiple antennas are used. Each antenna may be coupled to a dedicated receive chain having a radio receiver that process the incoming RF signal from a respective antenna. In an embodiment, each receive chain may include a radio receiver and a wake-up radio. In another embodiment, there may be a single wake-up radio that interacts with all the radio receivers in each receive chain. The embodiments are not limited in this manner.

Attention now turns to a discussion on the operations for the embodiments with reference to an exemplary method. It may be appreciated that the representative method does not necessarily have to be executed in the order presented, or in any particular order, unless otherwise indicated. Moreover, various activities described with respect to the method can be executed in serial or parallel fashion, or any combination of serial and parallel operations. The method can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 5:
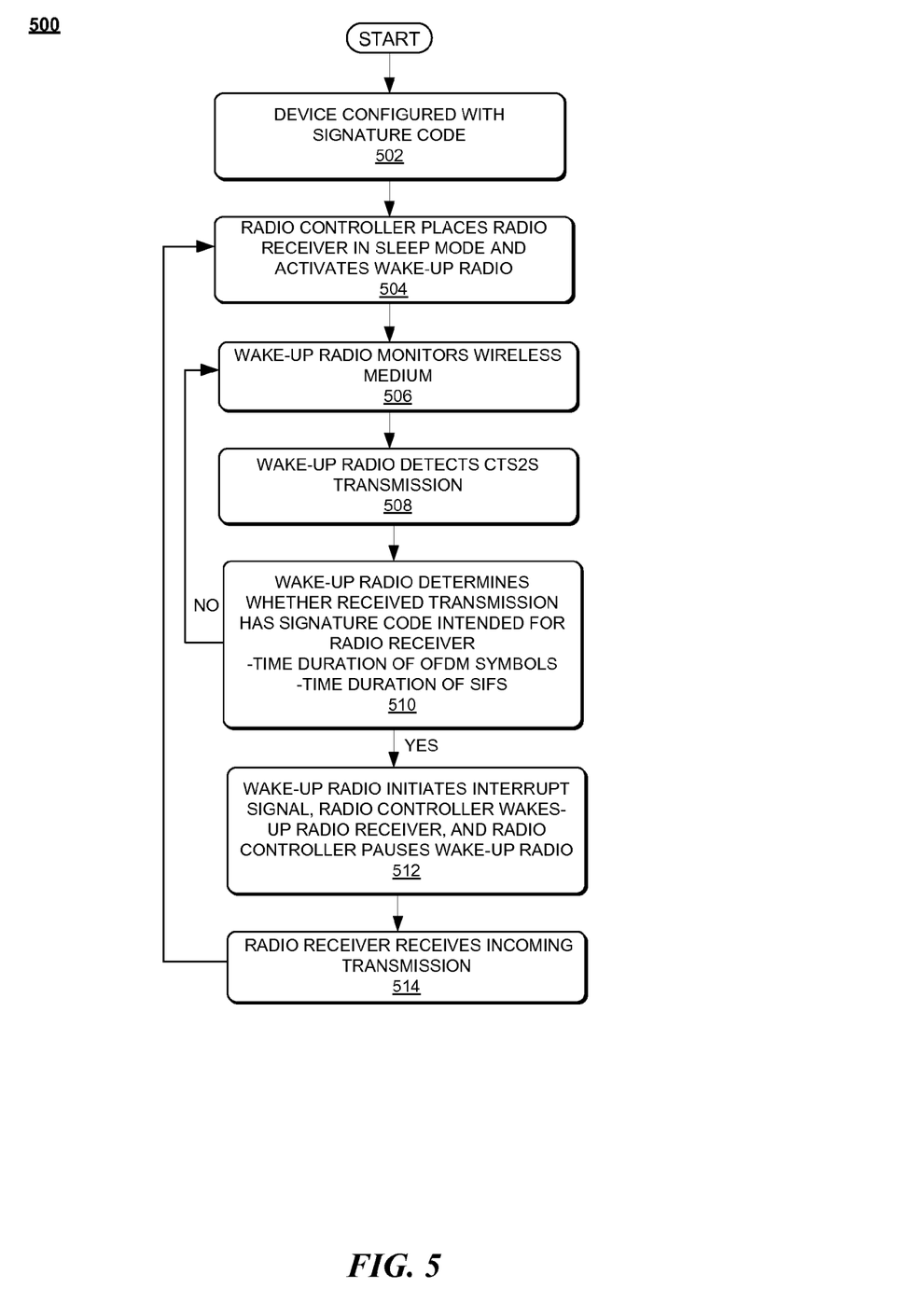
FIG. 5 is a flow diagram illustrating an exemplary method for utilizing a signature-coded wake-up transmission.

FIG. 5 illustrates a flow diagram of an exemplary method for receiving a signature-coded wake-up transmission. It should be noted that the method 500 may be representative of some or all of the operations executed by one or more embodiments described herein and that the method can include more or less operations than that which is described in FIG. 5.

Initially, the station is configured with a signature code (block 502). A radio receiver may be configured with the signature code when the radio receiver is manufactured, during operational boot-up or initialization by a system administrator of a station, or dynamically when the station associates with an access point. For example, when the station associates with an access point through an association request, the access point sends an association response back to the station which may contain the signature code. In this manner, the signature code may be altered in real time to accommodate any changes that may affect the operational efficiency of the network.

The radio controller 408 may place the radio receiver 402 in sleep mode and initiate the wake-up radio 404 to listen to the wireless medium (block 504). The wake-up radio 404 monitors the network traffic on the wireless medium (block 506). The wake-up radio 404 may monitor the wireless medium for beacons and other communications, such as a CTS2S transmission (block 506). A beacon is regularly transmitted to each station within a network at predetermined time intervals. A beacon is composed of beacon frames that carry data pertaining to the network which may change and as such, the stations must listen for the beacons. The wake-up radio 404 listens for the beacons while the radio receiver 402 is in sleep mode.

An AP may broadcast a CTS2S transmission to the stations in the BSS. The CTS2S transmission is addressed to the AP but it is detected by the stations within the BSS thereby causing those stations receiving the transmission to refrain from transmitting on the wireless medium for a predetermined period of time. The duration field in the CTS2S frame indicates the period of time in which the stations refrain from transmitting signals.

If the wake-up radio 404 detects a CTS2S transmission (block 508), then the wake-up radio 404 detects whether the transmission is intended for the radio device 400 (block 508). In the case of a CTS2S transmission, the wake-up radio 404 analyzes the duration of the energy of the CTS2S transmission at certain time intervals, in the manner described above, to recognize the signature code of the incoming CTS2S transmission.

In embodiments where the signature code is the OFDM symbol durations, the wake-up radio 404 detects the total duration of the energy of all OFDM symbols. If the total duration of all received OFDM symbols matches the signature code stored in the memory 410, then the wake-up radio 404 interrupts the radio controller 408 (block 510—yes). In embodiments where the signature code is based on the SIFS, the wake-up radio 404 detects the total duration of the energy of all received SIFS. If the total duration of all received SIFS matches the signature code stored in the memory 410, then the wake-up radio 404 interrupts the radio controller 408 (block 510—yes). The radio controller 408, in turn, wakes up the radio receiver 402 (block 512) to receive an incoming transmission (block 514). Otherwise, if the received transmission does not contain the signature code (block 510—no), then the wake-up radio 404 continues to monitor the wireless medium (block 506).

Although the signature code has been described with respect to the total duration of the energy of received OFDM symbols and SIFSs, the embodiments are not limited to these embodiments. Other possible embodiments may use a signature code as a combination of signal power, timing, duration, and frequency of received frames or have the signature code embedded in a basic service set identifier (BSSID). In addition, the signature code is not limited to the use of a CTS2S frame and in other embodiments, other types of frames may be used.

Attention now turns to a discussion of an exemplary wireless device configured to operate using the technology described herein. Various embodiments of the wireless device may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Figure 6:
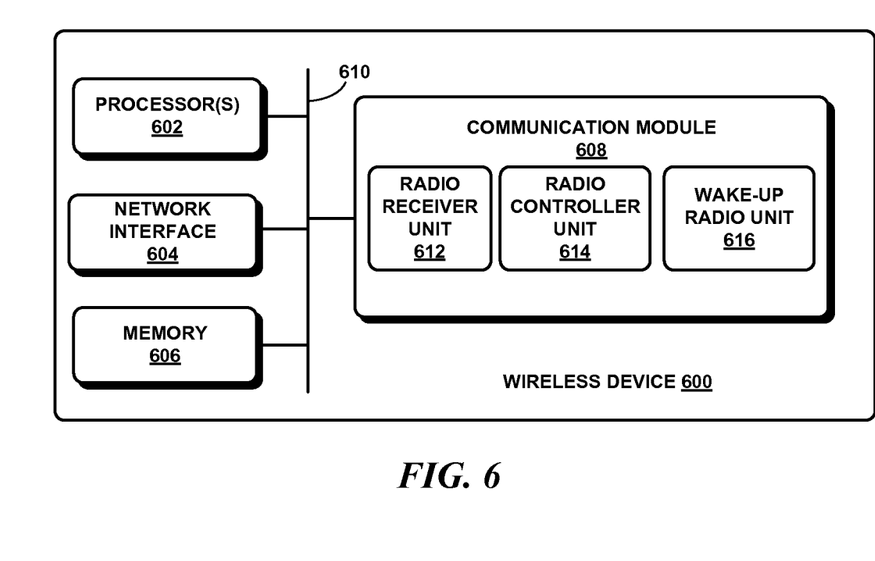
FIG. 6 is a block diagram illustrating an exemplary electronic device including a radio receiver.

Turning to FIG. 6, there is shown a block diagram of an exemplary wireless device 600. The wireless device 600 may be any type of electronic device capable of executing programmable instructions such as, without limitation, a mobile device, a personal digital assistant, a mobile computing device, a tablet, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof. In one or more embodiments, the wireless device 600 is a WLAN device capable of operating in accordance with an IEEE 802.11 specification.

The wireless device 600 may include at least one or more processors 602, a network interface 604, a memory 606, and a communication module 608 communicatively coupled through a communications link 610 (e.g., bus). A processor 602 may be any commercially available processor and may include dual microprocessors and multi-processor architectures. The network interface 604 facilitates wired and/or wireless communications between the wireless device 120 and a communications framework. The network interface 604 includes at least one wireless network interface (e.g., WLAN interface, a Bluetooth® interface, a WiMAX interface, and ZigBee® interface, a Wireless USB interface, etc.).

The memory 606 may be any machine-readable storage media that may store executable procedures, applications, and data. The machine-readable media pertains to non-transitory signals and not to propagated signals, such as modulated data signals transmitted through a carrier wave. Examples of a storage medium may include one or more types of machine-readable storage media capable of storing electronic data, including volatile memory or non-volatile memory, removable or non-removable memory, erasable or non-erasable memory, writeable or re-writeable memory, random access memory, read-only memory, magnetic storage, optical storage, DVD, CD, floppy disk drive, and the like. The memory 606 may also include one or more external storage devices or remotely located storage devices.

The machine-readable storage media may store various software elements, such as programs, procedures, module, applications, code segments, program stacks, middleware, firmware, methods, routines, and so on. In an embodiment, for example, a machine-readable storage medium may store executable program instructions that, when executed by a processor, cause the processor to perform methods and/or operations in accordance with the described embodiments. The executable program instructions may be implemented according to a predefined computer language, manner or syntax, for instructing a computer to perform a certain function. The instructions may be implemented using any suitable high-level, low-level, object-oriented, visual, compiled and/or interpreted programming language.

The communications module 608 may include a radio receiver unit 612, a radio control unit 614, and a wake-up radio unit 616. The radio receiver unit 610, radio control unit 614, and wake-up radio unit 616 may be implemented in hardware, software, or a combination thereof. The radio receiver unit 610 may include portions of the radio receiver 402 described herein, the radio control unit 614 may include portions of the radio controller 408 described herein, and the wake-up radio unit 616 may include portions of the wake-up radio 404 described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for communicating data by a device, comprising:
   scanning, via a wake-up receiver, for an incoming radio frequency (RF) signal while a radio receiver is in sleep mode;
   detecting an incoming RF signal;
   identifying a signature code based at least in part on a sum of a plurality of time intervals associated with a data frame characteristic in the incoming RF signal, wherein the data frame characteristic has a fixed timing structure; and
   waking the radio receiver if the incoming RF signal matches the signature code.

2. The method of claim 1, wherein the plurality of time intervals associated with the data frame characteristic comprises a plurality of orthogonal frequency division modulation (OFDM) symbol time intervals from a sequence of OFDM symbols received in the incoming RF signal.

3. The method of claim 1, wherein the plurality of time intervals associated with the data frame characteristic comprises a plurality of short interframe space (SIFS) time intervals from a sequence of SIFS used to transmit a sequence of orthogonal frequency division modulation (OFDM) symbols received in the incoming RF signal.

4. The method of claim 1, further comprising:
   receiving the signature code from an association response; and
   configuring the wake-up receiver with the signature code.

5. The method of claim 1, further comprising configuring the wake-up receiver with the signature code during system initialization.

6. The method of claim 1, further comprising receiving the signature code, in the incoming RF signal, through a Clear To Send To Self (CTS2S) transmission.

7. The method of claim 1, wherein the fixed timing structure is specified by an IEEE 802.11 specification.

8. A non-transitory machine readable storage medium, storing thereon processor-executable instructions, that when executed on a processor:
   detects an incoming RF signal having a signature code embedded therein, the signature code transmitted in a Clear To Send To Self transmission, wherein the signature code is identified based at least in part on a sum of a plurality of time intervals associated with a data frame characteristic in the incoming RF signal, wherein the data frame characteristic has a fixed timing structure;
   generates an interrupt signal if the signature code embedded in the incoming RF signal matches a stored signature code; and
   awakens a radio receiver from sleep mode in response to the interrupt signal.

9. The non-transitory machine readable storage medium of claim 8, wherein the plurality of time intervals associated with the data frame characteristic comprises a plurality of orthogonal frequency division modulation (OFDM) symbol time intervals from a sequence of OFDM symbols received in the incoming RF signal.

10. The non-transitory machine readable storage medium of claim 8, wherein the plurality of time intervals associated with the data frame characteristic comprises a plurality of short interframe space (SIFS) time intervals from a sequence of SIFS used to transmit a sequence of orthogonal frequency division modulation (OFDM) symbols received in the incoming RF signal.

11. The non-transitory machine readable storage medium of claim 8, further comprising processor-executable instructions, that when executed on a processor receives the stored signature code from an access point.

12. The non-transitory machine readable storage medium of claim 8, further comprising processor-executable instructions, that when executed on a processor: upon awakening of the radio receiver, receives an incoming transmission.

13. The non-transitory machine readable storage medium of claim 8, wherein the signature code is based at least in part on fixed timing structures specified by an IEEE 802.11 specification.

14. The non-transitory machine readable storage medium of claim 8, further comprising processor-executable instructions, that when executed on a processor receives the stored signature code from an association response.

15. A wireless device, comprising:
a radio receiver to receive and process a radio frequency (RF) signal, the radio receiver configured to operate in a sleep mode and an active mode, the RF signal configured in accordance with an IEEE 802.11 specification;
a radio controller, coupled to the radio receiver, that switches the radio receiver between the sleep mode and the active mode; and
a wake-up radio, coupled to the radio controller, to detect an incoming RF signal having a signature code embedded therein and to generate an interrupt signal to the radio controller when the signature code embedded in the incoming RF signal matches a stored signature code associated with the wireless device, the stored signature code being identified based at least in part on a sum of a plurality of time intervals associated with a data frame characteristic in the incoming RF signal, wherein the data frame characteristic has a fixed timing structure.

16. The wireless device of claim 15, wherein the plurality of time intervals associated with the data frame characteristic comprises a plurality of orthogonal frequency division modulation (OFDM) symbol time intervals from a sequence of OFDM symbols received in the incoming RF signal.

17. The wireless device of claim 15, wherein the plurality of time intervals associated with the data frame characteristic comprises a plurality of short interframe space (SIFS) time intervals from a sequence of SIFS used to transmit a sequence of orthogonal frequency division modulation (OFDM) symbols received in the incoming RF signal.

18. The wireless device of claim 15, wherein the fixed timing structure is set forth in an IEEE 802.11 specification.

19. The wireless device of claim 15, wherein the incoming RF signal is associated with a Clear To Send To Self (CTS2S) transmission.

20. The wireless device of claim 15, wherein the stored signature code is received by the wireless device through an association response.

21. A wireless device comprising:
a radio receiver;
means for scanning an incoming radio frequency (RF) signal while the radio receiver is in sleep mode;
means for identifying a signature code based at least in part on a sum of a plurality of time intervals associated with a data frame characteristics in the incoming RF signal, wherein the data frame characteristic has a fixed timing structure; and
means for waking the radio receiver if the incoming RF signal matches the signature code.

22. The wireless device of claim 21, wherein the plurality of time intervals associated with the data frame characteristic comprises a plurality of orthogonal frequency division modulation (OFDM) symbol time intervals from a sequence of OFDM symbols in the incoming RF signal.

23. The wireless device of claim 21, wherein the plurality of time intervals associated with the data frame characteristic comprises a plurality of short interframe space (SIFS) time intervals from a sequence of SIFS used to transmit a sequence of orthogonal frequency division modulation (OFDM) symbols in the incoming RF signal.

24. The wireless device of claim 21, wherein the radio receiver is configured to receive the signature code from an association response, the wireless device further comprising means for comparing the incoming RF signal with the signature code received from the association response.

25. The wireless device of claim 21, further comprising means for identifying the signature code during initialization of the wireless device.

26. The wireless device of claim 21, further comprising means for receiving the signature code in the incoming RF signal through a Clear To Send To Self (CTS2S) transmission.

27. The wireless device of claim 21, wherein the fixed timing structure is specified by an IEEE 802.11 specification.

* * * * *